Oct. 21, 1952 R. M. ULRICH 2,614,866
HYDRAULIC COUPLER VALVE CONSTRUCTION
Filed Aug. 10, 1950
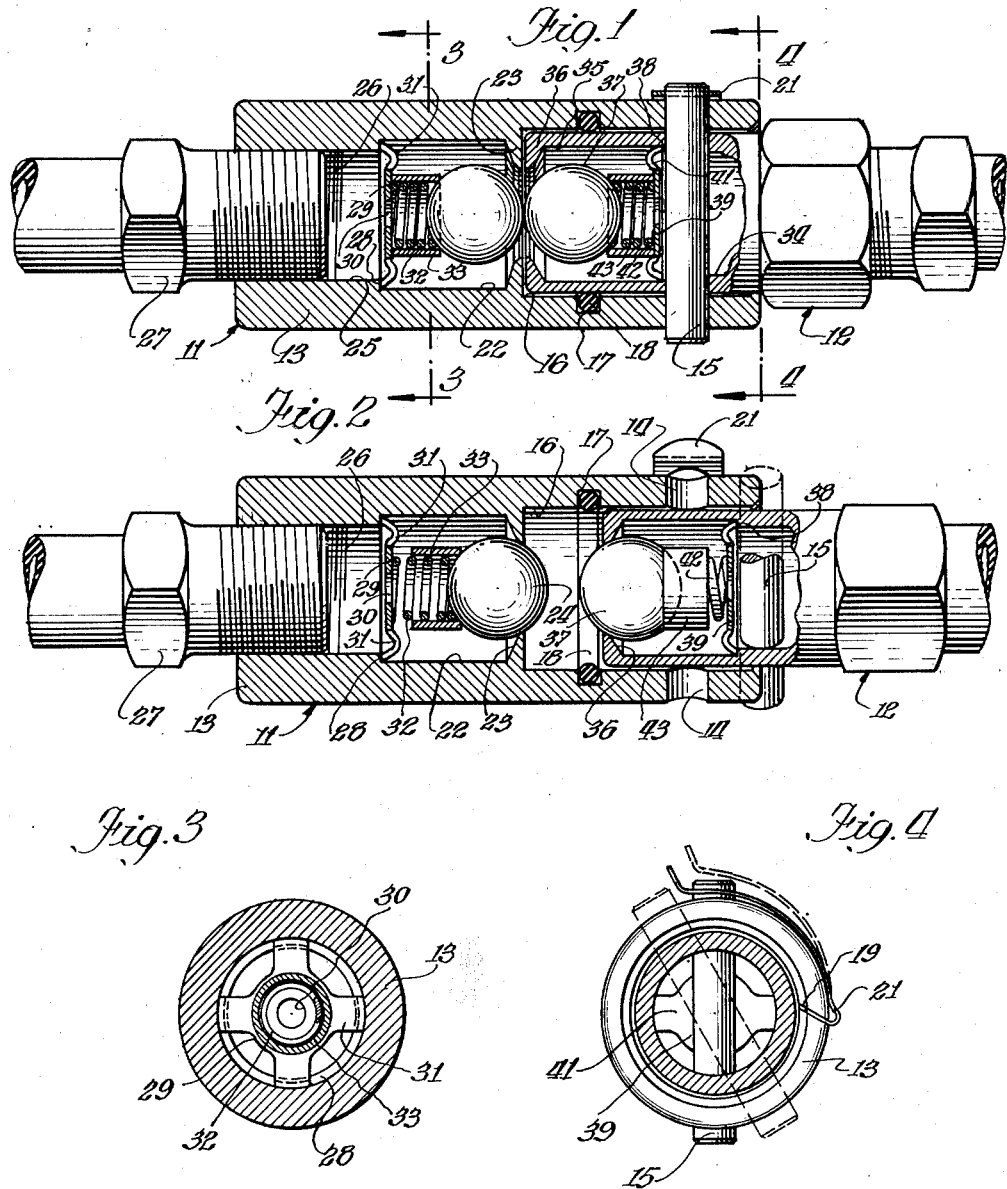
Inventor:
Raymond M. Ulrich
By: Alois U. Graf Attorney Patented Oct. 21, 1952

2,614,866

UNITED STATES PATENT OFFICE 2,614,866

HYDRAULIC COUPLER VALVE CONSTRUCTION

Raymond M. Ulrich, Roanoke, Ill., assignor to Ulrich Foundation, Inc., a corporation of Delaware Application August 10, 1950, Serial No. 178,644

2 Claims. (Cl. 284—18)

The present invention relates to an improved separable coupling for fluid conduits.

Separable hydraulic couplers are becoming more widely used for interconnecting the fluid conduits between a source of power, usually carried on a tractor, and an actuating or control mechanism carried on an implement drawn by the tractor. In many cases it is desired to provide a relatively simple and economical coupler which, when separated, seals each member so as to prevent the loss of fluid.

In providing a simple, economical coupler there are certain considerations in the construction, which are believed to be desirable. For a simple coupler a bayonet connection is commonly employed between the male and female portions. Under certain conditions it has been found that the vibration may uncouple these portions and, hence, it would be desirable to provide a simple latch to obviate this disadvantage.

Furthermore, in the construction of a simple closure mechanism it has been found desirable to provide improved means for guiding the closure ball so as to maintain it in axial alignment when the valve is open.

It, therefore, is an object of the present invention to provide an improved separable coupling particularly suited for hydraulic conduits.

Still another object of the present invention is to provide a relatively simple and economical coupling having a simple, inexpensive latching member for maintaining the coupling portions in coupled relation.

Still another object of the present invention is to provide an improved closure ball guide mechanism for a separable coupling.

A still further object of the present invention is to provide an improved limit stop construction for a closure ball, which also serves to reduce fluid turbulence.

Other and further objects of the present invention subsequently will become apparent by reference to the following description taken in conjunction with the accompanying drawing wherein:

Figure 1 is a cross-sectional view of a coupler in coupled relation embodying the features of the present invention;

Figure 2 is another cross-sectional view showing the elements of the coupler of Figure 1 in uncoupled positions;

Figure 3 is a cross-sectional view as seen in the direction of the arrows along the line 3—3 of Figure 1; and Figure 4 is a view as seen in the direction of the arrows along the line 4—4 of Figure 1.

In accordance with the present invention a relatively simple coupling device 11 comprises a female member 13 and a male member 12. The female member is provided with a pair of inclined slots 14, which are engaged by a pin 15 carried by the male member 12. The inclined slots 14 terminate in a straight portion somewhat similar to bayonet slots, but have only very slight recesses, which provide for a slightly retroactive movement on the part of the male member. This is due to the fact that the male and female members are provided with ball closures, which are displaced from the valve seats by contact with each other and, hence, for maximum efficiency it is necessary to maintain the valve seats of both the male and female members closely adjacent. Any appreciable separation therebetween would lessen the size of the opening and might furthermore introduce increased turbulence in the fluid flow.

The female member 13 is provided at one end with a cylindrical opening 16 for receiving the male member. Within the opening 16 there is provided an annular recess 17 fitted with a packing ring such as the O-ring 18. The O-ring 18 engages the cylindrical outer surface of the male member prior to the time that the closure balls of the two members are displaced from their respective seats, and hence, a sealed passage is provided prior to the flow of fluid through the coupling members. In order to conveniently latch the male member into position, the female portion is provided with an inclined slot 19 into which is fitted a latching spring 21 having adjacent its outer extremity a suitable aperture for receiving one of the extremities of the pin 15. From the representation shown in Figure 4 it will be observed that it is necessary to move the latching spring 21 to the dotted line position in order to free or unlatch the pin 15 so that it may be rotated in the slot 14 to the dotted line position to permit uncoupling of the two members.

The female member 13 is provided with a cylindrical bore 22 terminating in a seat 23. The valve seat 23, as may be seen from Figure 2, is engaged by a closure ball 24. The female member 13 is further provided with another bore 25 of reduced diameter having a threaded portion 26 engaged by the threaded end of a conduit 27. The difference between the diameters of the two bores 22 and 27 provides a shoulder 28, which is engaged by a transversely arranged support 29 having a central opening 30 and radially extending legs 31. Each of the legs 31, of which there may be three or more, have curved configurations, as is apparent from Figures 1 and 2, so that the members 29 may be inserted into the bore 22 by passage through the bore 26. The radially extending legs 21 are sufficiently resilient that they will snap into position and engage the shoulder 28.

The transversely arranged support member 29 is engaged by a spring 32, which urges the ball 24 towards closed position. The spring 32 when compressed, as in Figure 1, is completely enclosed by a sleeve 33, which serves a plurality of purposes. The sleeve 33 engages the ball 24 to limit its axial displacement from the valve seat and to guide the ball so as to maintain it in axial alignment. In addition, the sleeve 33 serves to reduce the turbulence of the fluid flowing through the passage, which otherwise might be greater if the convolutions of the spring 32 were engaged by the flow of the fluid through the conduit.

The male member has a bore 34, which is slightly smaller than the bore 35, terminating in a valve seat 36. The valve seat 36 is arranged to be closed by the ball closure 37. The difference in diameters of the bores 34 and 35 provides a shoulder 38, which is engaged by the legs of the transverse support member 39. The member 39 has a plurality of legs 41, having the same configuration as the legs 31 of the member 29. A spring 42 is interposed between the support 29 and the closure ball 37, and the spring is surrounded by the guide and limit stop sleeve 43.

From the representation shown in Figure 1, it will be appreciated that when the male and female portions of the coupling device are connected together, the closure balls 24 and 37 touch each other and, hence, are displaced from their seats by amounts determined by the limit stop sleeves 32 and 42. By so limiting the movement of the closure balls, positive assurance is obtained that each of the balls will be displaced the same distance irrespective of any minor variations, which might occur during manufacture, in the pressure exerted by the springs 32 or 42.

In the copending application, Serial No. 762,048, there is disclosed a method of making an adjustment to determine exactly the allowable displacement of the closure ball from its seat. Accordingly, in the assembly of the present construction, force is applied to each closure ball by a member which forces the ball to a position where it is tangent to a member engaging the outer surface of its respective valve seat. This produces a certain permanent deformation in the legs of the transversely arranged support member, which engages the spring engaging the closure ball. Hence, it will be appreciated that in the construction shown, the distance each ball may be moved from its seat is accurately and permanently predetermined.

Each of the transversely arranged supports 29 or 39, having radially extending legs 31 or 41, are preferably formed of material so that the transversely arranged legs have a certain amount of resilience. The resilience of these legs, however, is appreciably less than the resilience of the coiled springs 32 or 42. The resilience of the radial legs in addition to permitting the support to be snapped into position, serves another purpose when it is desired to couple the units together when one of the conduits is under fluid pressure. If it is assumed that conduit 27 extends to a hydraulic cylinder, which is elevating a load such as a grader bucket or a wagon box, the weight on the piston and cylinder will produce a certain fluid pressure. Assuming that the coupler has been uncoupled while the piston in such cylinder is in extended position, the pressure of the fluid against the ball 24 will resist attempts to displace the ball when the male portion 12 engages the angular slots 14. This makes it rather difficult to manually couple the two portions together, if it is assumed that a displacement of the ball 35 against its stop 43 is the only movement which can occur. Quite obviously the ball 37 will be displaced from its seat without moving the ball 24 during the coupling operation since there is a greater force being exerted ball 37 has been moved as far as possible and yet the ball 24 has not been displaced from its seat. Hence the two coupling units are not yet connected together.

Further efforts to connect the coupler together will produce a deflection of the transverse support 39 to an extent sufficient to permit the two halves of the coupler to be connected together. Thereupon the ball 24 will be displaced from its seat. This difference in resilience between the spring which normally urges the ball toward closure and the resilience of the stop member greatly facilitates coupling together the coupler while one of the lines is under hydraulic fluid pressure.

While for the purpose of illustrating and describing the present invention a preferred construction has been shown in the drawing, it is to be understood that such variations in the construction are contemplated as may be commensurate with the spirit and scope of the invention set forth in the accompanying claims.

I claim as my invention:

1. A separable cylindrical hydraulic coupling having male and female members each having a passage provided with a shoulder and a valve seat, a closure ball for each seat, a support having a plurality of radially extending curved resilient legs engaging said shoulder, a spring mounted between said support and said ball, and a stop sleeve surrounding a portion of said spring, said ball closures being limited in their movements and held in axial alignment in engagement with each other by said sleeves when said members are coupled together.

2. In a separable hydraulic coupling the combination comprising a member having a passage terminating in a valve seat, a closure ball in engagement with said seat, said passage having a shoulder therein, a coiled spring urging said ball toward said seat and mounted on a support member arranged transversely of said passage and having resilient radial legs engaging said shoulder, said legs being less resilient than said coiled spring, and a stop member sleeve for said ball, said sleeve surrounding said spring for limiting the compression of said spring whereby further force applied to said ball will cause flexure of said legs.

RAYMOND M. ULRICH.

REFERENCES CITED

The following references are of record in the file of this patent:

UNITED STATES PATENTS

| Number | Name | Date |
|---|---|---|
| 617,591 | Miller et al. | Jan. 10, 1899 |
| 905,916 | Orr et al. | Dec. 8, 1908 |
| 1,293,604 | Woolever | Feb. 4, 1919 |
| 1,965,692 | Dodge | July 10, 1934 |
| 2,322,449 | Johnson et al. | June 22, 1943 |